Figure 1A:
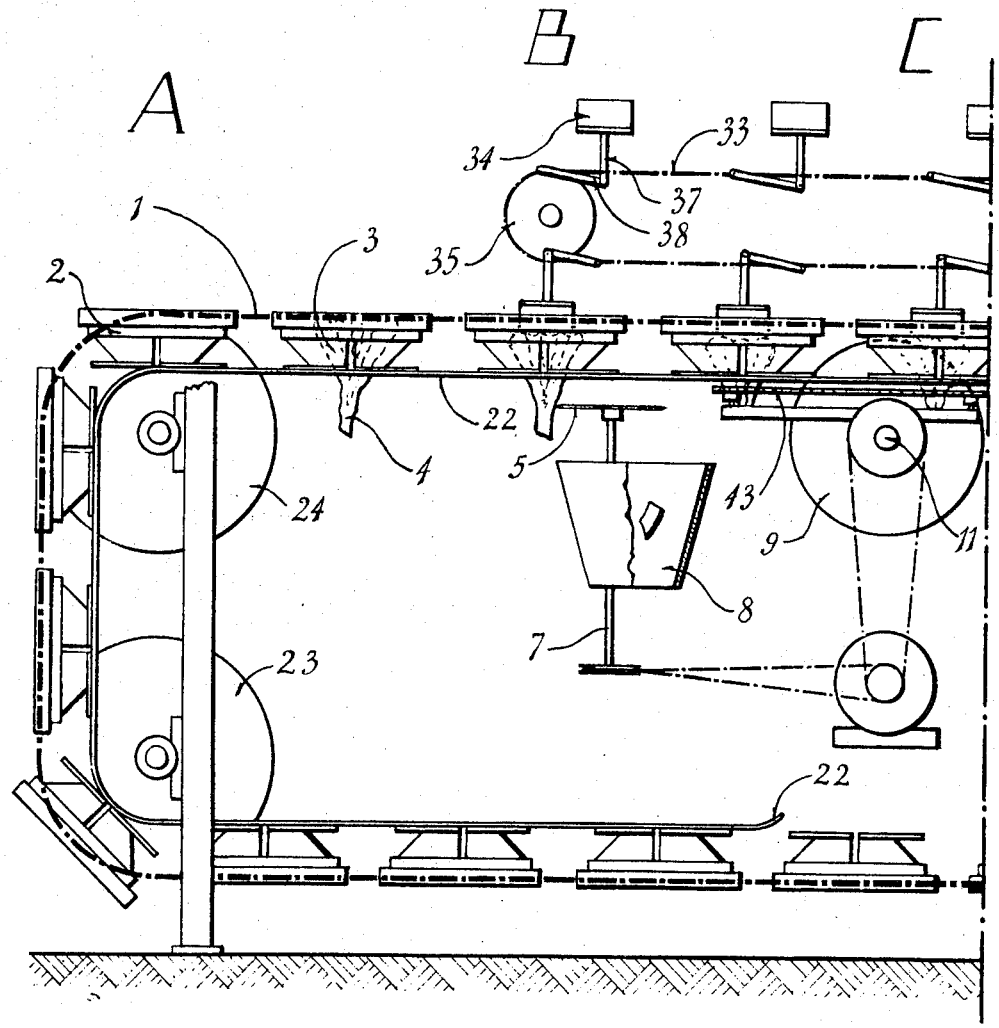

United States Patent
Akesson et al.

[15] 3,695,323
[45] Oct. 3, 1972

[54] VEGETABLE TRIMMING AND CUTTING APPARATUS

[72] Inventors: Yngve Reinhold Akesson, Halsingborg; Lars Gustaf Albert Wadell, Astorp, both of Sweden

[73] Assignee: Produits Findus S.A., Vevey, Switzerland

[22] Filed: Oct. 29, 1970

[21] Appl. No.: 85,188

[30] Foreign Application Priority Data

Nov. 3, 1969 Great Britain..........53,730/69

[52] U.S. Cl. ..........146/81 R, 146/78 R, 146/DIG. 9
[51] Int. Cl. ......A47j 21/00, A47j 17/16, A47j 43/18
[58] Field of Search...............146/78 R, 81 R, DIG. 9

[56] References Cited

UNITED STATES PATENTS

| | | | |
|---|---|---|---|
| 3,653,418 | 4/1972 | Oldershaw | 146/81 R |
| 3,478,795 | 11/1969 | Thornsbery | 146/81 R |
| 3,374,881 | 3/1968 | Schwacofer | 146/81 R |
| 3,399,703 | 9/1968 | Schwacofer | 146/81 R |
| 1,906,438 | 5/1933 | Vetch | 146/81 R |
| 3,424,216 | 1/1969 | Anderson | 146/81 R |
| 3,179,138 | 4/1965 | Norris | 146/81 R |
| 1,989,090 | 1/1935 | Ewald | 146/DIG. 9 |
| 2,335,849 | 12/1943 | Ewald | 146/DIG. 9 |
| 3,478,794 | 11/1969 | Alpen | 146/78 R |

FOREIGN PATENTS OR APPLICATIONS

| | | | |
|---|---|---|---|
| 233,697 | 5/1961 | Australia | 146/81 R |
| 830,998 | 3/1969 | Great Britain | 146/81 R |

*Primary Examiner*—Wayne A. Morse, Jr.
*Attorney*—Blum, Moscovitz, Friedman & Kaplan

[57] ABSTRACT

Apparatus for continuously trimming and cutting broccoli or similar plants, which comprises:
  an endless conveyor carrying a plurality of pockets,
  each pocket comprising at least two equal segments defining an axially symmetrical hollow enclosure having a wider opening and a narrower opening at opposite axial ends to receive a plant with the lower stalk protruding through the narrower opening,
  the segments being separated by diametrically opposed gaps parallel to the axis of the pocket,
  the segments being independently pivoted at a point adjacent said wider opening to open outwards to release the plant,
  and at least one knife positioned to traverse said gaps when the gaps are aligned in the direction of motion of the conveyor to slice the planes. Other features of the invention appear in the following specification and drawings.

9 Claims, 3 Drawing Figures

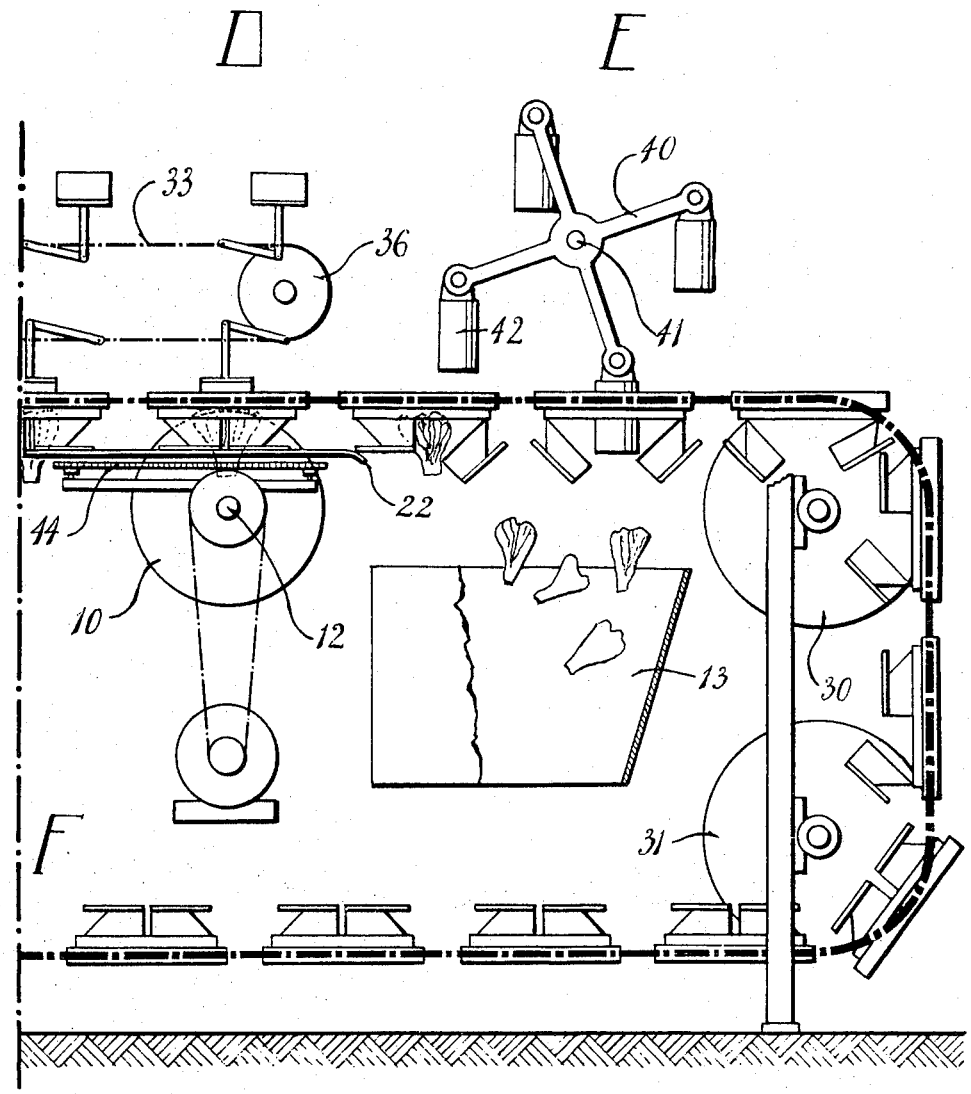

VEGETABLE TRIMMING AND CUTTING APPARATUS

The present invention relates to an apparatus for trimming and cutting broccoli or similar plants.

Although primarily designed for broccoli plants, the apparatus may also be used for trimming and cutting other vegetables having a stalk and leaves or other edible matter protruding more or less symmetrically from the upper part of the stalk.

After removing the roots and washing the plants to remove foreign matter, it is usually desired to cut the unwanted stalk ends from the plant and slice the plant vertically, generally into four quarters. Hitherto this operation has been done by hand and the cost of the labor employed is considerable. The present invention provides an apparatus for performing this operation continuously and automatically.

According to the invention, apparatus for continuously trimming and cutting broccoli or similar plants comprises an endless conveyor carrying a plurality of pockets, each pocket comprising at least two equal segments defining an axially symmetrical hollow enclosure having a wider opening and a narrower opening at opposite axial ends to receive a plant with the lower stalk protruding through the narrower opening, the segments being separated by diametrically opposed gaps parallel to the axis of the pocket, the segments being independently pivoted at a point adjacent said wider opening to open outwards to release the plant, and at least one knife positioned to traverse said gaps when the gaps are aligned in the direction of motion of the conveyor to slice the plants.

The apparatus is preferably mounted with the pockets hanging vertically in their operative position and the knife to traverse the gaps is vertically below the conveyor.

A preferred embodiment of the invention, given by way of illustration only, will be described with reference to the accompanying drawings.

FIGS. 1a and 1b are a vertical elevation of a preferred embodiment of the apparatus.

Figure 2:
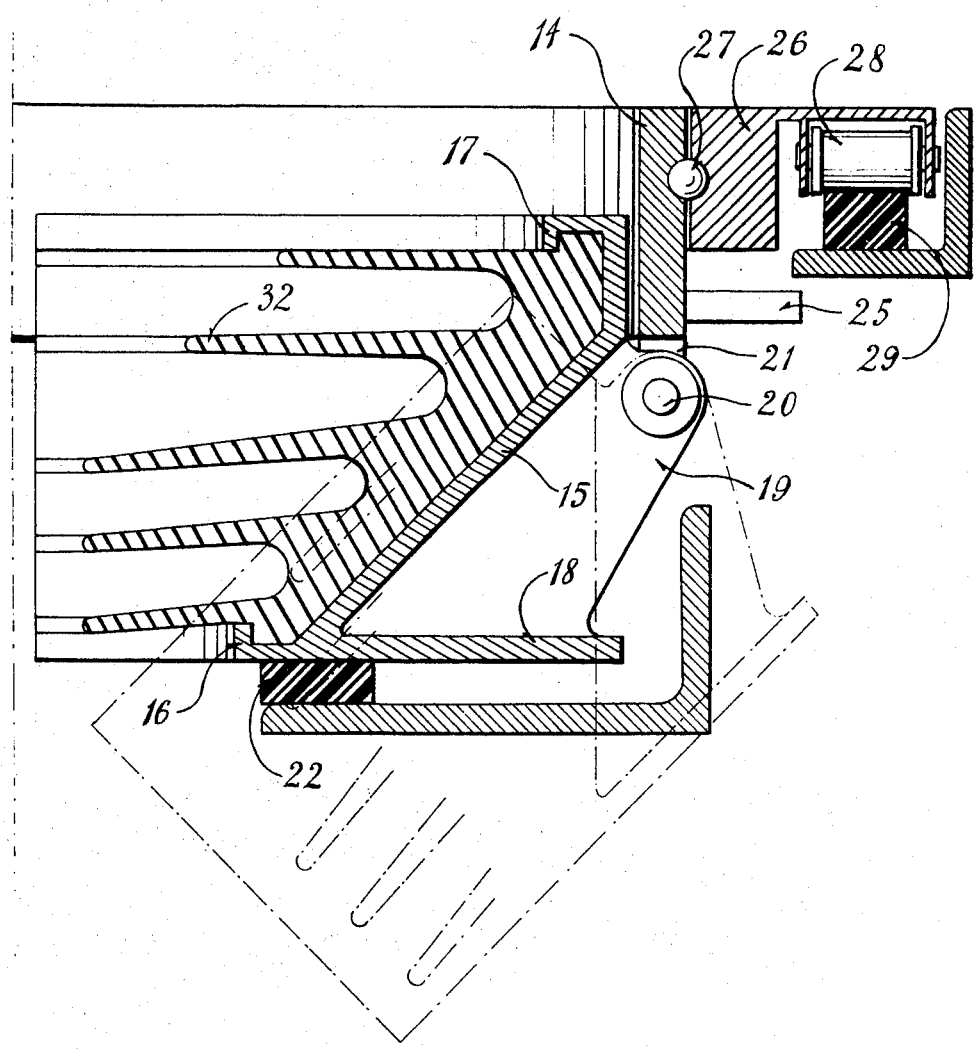

FIG. 2 is a partial section of the conveyor 1 and of the pockets 2 shown in FIGS. 1a and 1b.

According to the preferred embodiment of the invention, an endless conveyor 1 is mounted to move horizontally and carries a number of pockets 2 adapted to hold the broccoli plants 3 in the vertical position with the lower parts 4 of the stalks protruding from the lower ends of the pockets. The plants are fed to the pockets by hand at a point indicated generally at A in FIG. 1 and the cut plants are subsequently discharged at point E.

As they are moved by the conveyor the pockets containing the uncut plants inserted at A pass a point B at which a horizontal knife 5 is positioned to sever the extremities of the protruding lower plant stalks 4 as they pass the knife. Knife 5 preferably comprises a rotating circular blade mounted on a spindle 7 rotated by an electric motor. As the pockets pass the rotating knife, the ends of the stalks are severed and fall into the receptacle 8 for subsequent disposal.

After passing the horizontal knife 5 the pockets are carried past vertical knives 9 and 10 at respective positions generally indicated by C and D. These knives comprise circular blades mounted on shafts 11 and 12 respectively which are rotated by means of electric motors. Knives 9 and 10 are aligned in the longitudinal axis of symmetry of the conveyor and the upper portions of the blades intersect the pockets as they pass the knives, thus vertically slicing the plants within the pockets. As explained below, the pockets have vertical slots to allow the knife blades to pass through.

After passing the vertical knives the pockets pass above a receptacle 13 into which the sliced plants are allowed to drop. The empty pockets are then carried back to station A by the conveyor. The return path, indicated generally by F, is advantageously vertically below the operative path A – E of the conveyor.

As shown in FIG. 2, each of the pockets comprises a circular collar 14 from which are suspended four similar segments 15. Each segment is in the shape of a quadrant of a frustum of a cone, with inner flanges 16 and 17 inside the narrower and wider edges respectively. The narrower edge also has an outer flange 18, which is substantially horizontal when the segments are in the position shown in FIG. 2.

The segments of each pocket all have members 32 of a resilient material such as rubber on their inside surfaces, with a number of inwardly-projecting fingers which support the plant when within the pocket.

Each segment has two parallel flanges 19 connected by a pin 20 which passes through a lug 21 projecting downwards from the collar 14 between the flanges 19. The segment can thus rotate about the journal between its upper position shown in FIG. 2 and a lower position in which the flange 16 is approximately vertically below the rim of collar 14. In their upper position, the segments of each pocket form a frustoconical enclosure with a vertical axis.

While the pockets are moving from A to D, the segments are supported in the upper position shown in FIG. 2 by longitudinal rails 22 positioned on either side of the conveyor. Rails 22 abut the lower surface of flanges 18. The plants are supported in the enclosures so formed while traversing the knives and at E the segments fall open under gravity to release the cut plants.

As the pockets travel back to position A they are inverted while traversing portion F of the conveyor and so fall back under gravity into the closed position. While moving vertically between sprockets 23 and 24 which support the conveyor they are held closed by rail 22.

To allow the collar 14 to rotate within a non-rotatable ring 26 fixed to the conveyor, collar 14 and ring 26 have corresponding annular semicircular channels defining a race 27 in which balls are mounted.

When in the upper position, the edges of adjacent segments are separated by gaps through which the knives 9 and 10 can move.

In the present embodiment, the plants are sliced vertically into four equal pieces and so the pockets containing the plants must be rotated through 90° between knives 9 and 10. This is achieved by providing a number of teeth 25 projecting from the side of collar 14 which engage a fixed trip device (not shown), preferably vertically mounted rollers positioned beside the conveyor between knives 9 and 10. Preferably each collar has eight teeth 25 at regular intervals around the circumference and two successive trip rollers are positioned to engage two successive teeth to rotate the collar through 90°.

In order to ensure that the pockets are correctly aligned with the vertical knives 9 and 10 during cutting, the position of the collar 14 within the ring 26 is fixed by means of a number of hemispherical sockets separated by 90° in the outside surface of the collar 14 which engages a ball held in a springloaded mounting (not shown) secured to the ring 26.

Ring 26 carries rollers 28 which are arranged to roll along rail 29 beside the conveyor and the rings 26 are successively connected by a chain forming the conveyor. Preferably the conveyor comprises two chains, mounted on either side of the rings 26, including the rollers 28 and supported and driven by pairs of sprockets 23, 24, 30 and 31.

While the plants are being cut, it is desirable that they are positioned in the pockets at a constant height. To allow the machine to cut plants of differing sizes, levelling means are provided to press the plants down to a constant height in the pockets, the resilient members 32 bending downwards to the extent required for each plant.

The levelling means comprises an endless chain 33 mounted above and parallel to the portion of conveyor 1 above the knives. Chain 33 is driven to travel at the same speed as conveyor 1 and carries levelling members 34 arranged one above each pocket between the chain and the conveyor. Members 34 press downwards on the plants in the pockets and are held in a constant vertical position while pressing downwards on the plants, thereby ensuring a constant height of the plants in the pockets.

The chain 33 is supported and driven by sprockets 35 and 36. The levelling members 34 are supported thereon by pairs of rods 37 attached to the chain by pivots. The rods project beyond the chain on the side remote from members 34 and the ends are pivoted to one end of other pairs of rigid rods 38, the other end of rods 38 being pivoted to the chain. Rods 37 and members 34 are thus rigidly secured in the vertical position on the horizontal portion of the chain.

When the pockets are traversing the knives 9 and 10 it is desirable to hold the plant stalks protruding from the pockets in the vertical position in order to ensure a regular cut. Means for holding the stalks are shown in FIGS. 1a and 1b. Immediately below the rail 22 and beside the knife blade 9, (respectively 10), is mounted a pair of horizontal chains 43, (respectively 44), which are mounted on and driven by vertical spindles. At least one spindle for each chain is driven by conventional means, not shown, so that the chains move at the same speed as conveyor 1. The inner portions of the chains approach each other closely when adjacent the knife and so the stalks protruding from the pockets are gripped between the chains and held in a substantially constant position during cutting. Holding means of this type are provided for each of the knives 9 and 10.

To accommodate different thicknesses of broccoli stalks, the chains 43 and 44 are preferably resiliently mounted and urged towards the knife blades 9 and 10, respectively, by spring or other means, not shown.

In order to ensure that the cut plants are discharged from the pockets above the receptacle 13, a discharging device is preferably provided to push the plants downwards. This device may comprise rotatable arms 40 mounted on a horizontal shaft 41. At the end of each arm is suspended a relatively heavy plunger 42. Shaft 41 is rotated, by conventional means not shown in the drawing, so that the plungers descend on each pocket as they pass above the receptacle 13 and push the cut plants through the opened pockets.

We claim:

1. Apparatus for continuously trimming and cutting broccoli or similar plants, which comprises:
    an endless conveyor carrying a plurality of pockets,
    each pocket comprising at least four equal segments defining an axially symmetrical hollow enclosure having a wider opening and a narrower opening at opposite axial ends to receive a plant with the lower end protruding through the narrower opening,
    the segments being separated by diametrically opposed gaps parallel to the axis of the pocket,
    the segments being independently pivoted at a point adjacent said wider opening to open outwards to release the plant,
    a plurality of sequential, vertically-oriented knives each positioned to traverse a pair of opposing gaps when said pair of opposing gaps is aligned in the direction of motion of the conveyor to slice the plants,
    and means for rotating said pockets between each pair of successive vertically-oriented knives, each of said means for rotating the pockets being adapted to rotate said pockets sufficiently to bring a previously untraversed pair of gaps into alignment with the direction of motion of said conveyor and thereby bring said untraversed pair of gaps into position for traversing by the following vertical knife, the number of vertically-oriented knives being equal to the number of vertical slices desired to be made through said plants held by said pockets said segments being pivoted to an annular collar surrounding said wider opening and said collar being mounted by bearing means for rotation within a ring secured to and carried by said conveyor.

2. Apparatus according to claim 1 in which the pockets hang vertically downwards in their operative positions and the knives arranged to traverse the gaps are vertically mounted below the conveyor.

3. Apparatus according to claim 2 comprising segments which are arranged to fall open under gravity and means supporting the segments in the closed position while they traverse the knives.

4. Apparatus according to claim 3 wherein said means supporting the segments is a longitudinal rail.

5. Apparatus according to claim 1 further comprising a horizontal knife disposed below said pockets carrying plants for cutting off the ends of the stalks of said plants.

6. Apparatus according to claim 1 having ejecting means for ejecting the cut plants from the pockets.

7. Apparatus according to claim 6 in which the ejecting means comprises a plurality to downwardly-directed plungers mounted on a rotatable wheel positioned above the conveyor at the point at which the segments are disposed to fall open.

8. Apparatus according to claim 1 having holding means for holding the lower stalks of the plants protruding from the narrower openings in a vertically aligned position during cutting.

9. Apparatus according to claim 8 in which the holding means comprises a pair of parallel endless belts or chains having opposed surfaces arranged to grip therebetween the protruding lower stalks.

* * * * *